Feb. 28, 1933.  A. A. BUSH  1,899,258
INTERCHANGEABLE MATRIX MOLD
Filed Nov. 4, 1929  2 Sheets-Sheet 2

INVENTOR
ALBERT A. BUSH.
BY
Ely & Barrow
ATTORNEYS

Patented Feb. 28, 1933

1,899,258

UNITED STATES PATENT OFFICE

ALBERT A. BUSH, OF AKRON, OHIO, ASSIGNOR TO THE FIRESTONE TIRE & RUBBER COMPANY, OF AKRON, OHIO, A CORPORATION OF OHIO

INTERCHANGEABLE MATRIX MOLD

Application filed November 4, 1929. Serial No. 404,542.

This invention relates to interchangeable matrix sections for circular molds and more particularly to interchangeable tread forming matrices for tire molds.

Heretofore in molds of this type it has been customary to cast the molds in halves and then after machining to the proper size to engrave them with mold tread engraving machines. If, however, the tread design became obsolete the whole mold was generally discarded. Some attempts have been made to machine out the old tread and engrave in a new tread for a larger size tire. This method, however, has a limit and also leads to other difficulties.

An object of the invention is the provision of interchangeable matrix sections for circular molds.

A more particular object of the invention is to provide a tire mold with interchangeable tread forming matrices which can be readily and quickly changed and yet which are held securely and positively in position by a minimum of fastening means.

A further object is to reduce the cost of tire forming molds.

The above and other objects of the invention are attained by the apparatus illustrated in the accompanying drawings and described below, it being understood that the invention is not limited to the specific embodiment thereof described and shown.

Figure 1:
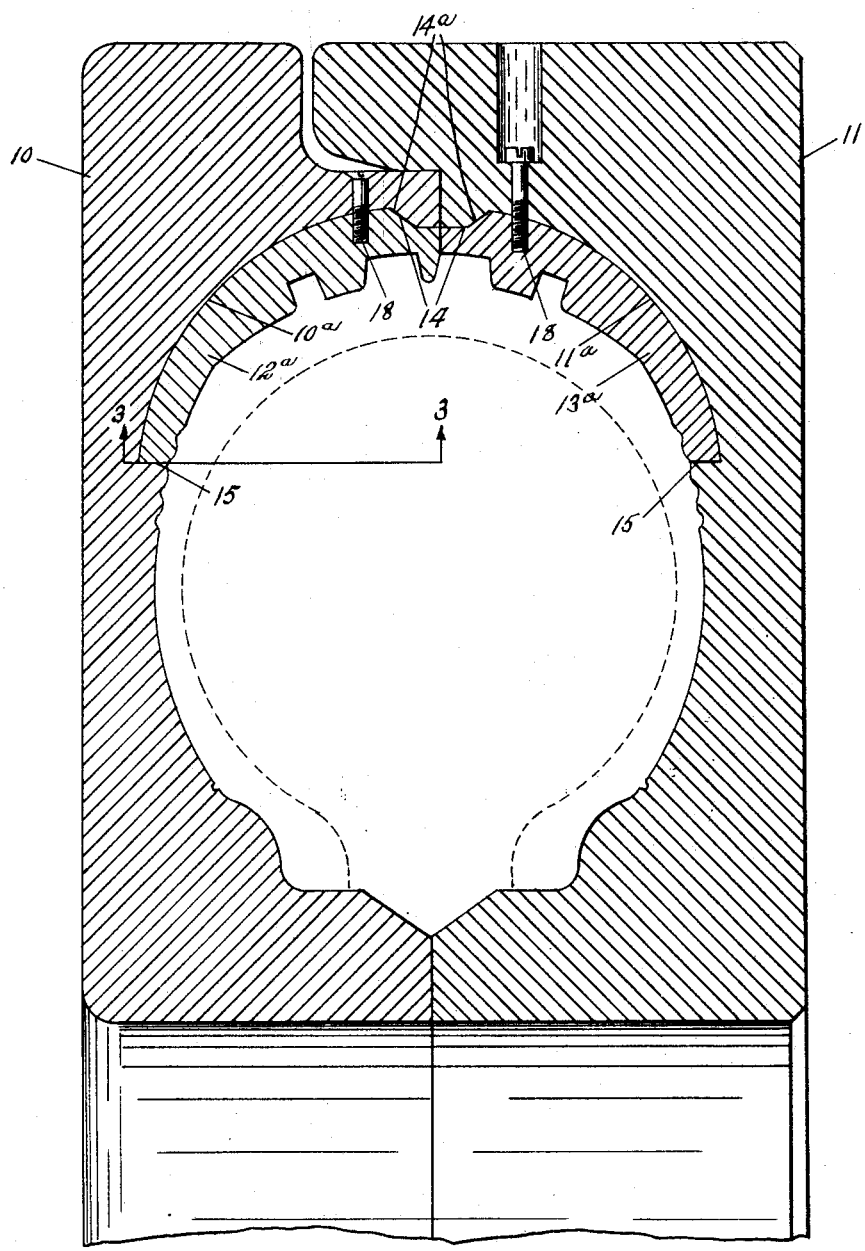
Figure 1 is a sectional view through a tire mold embodying the invention.
Figure 2:
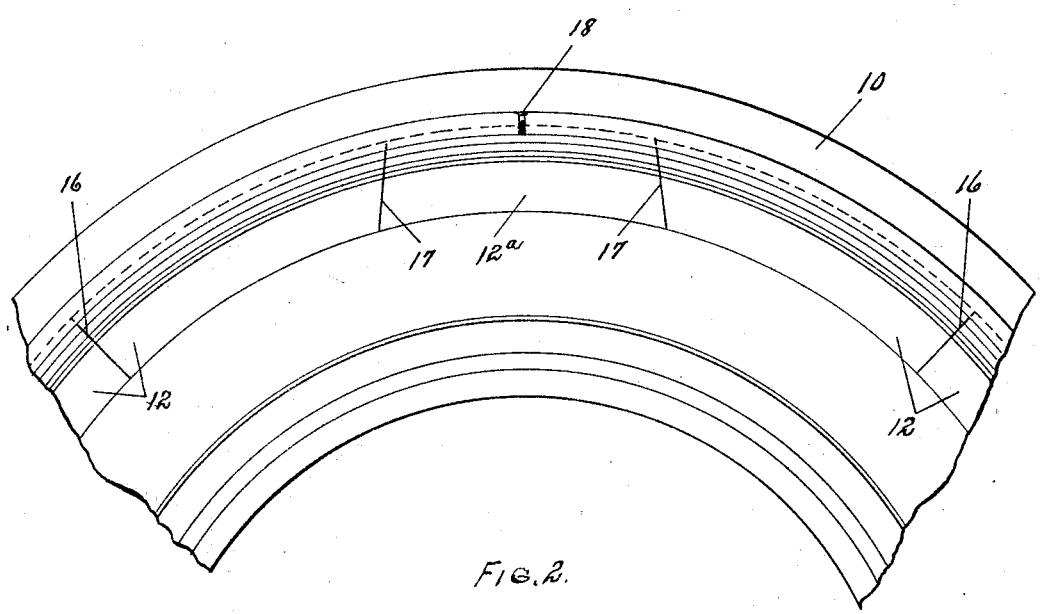
Figure 2 is a partial plan view of the male half of the tire mold.
Figure 3:
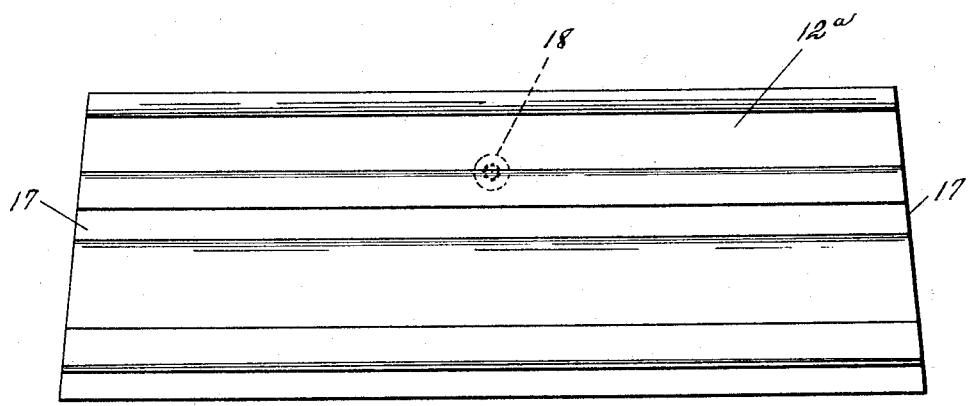
Figure 3 is a view of the locking matrix section taken on the line 3—3 of Figure 1.

In the drawings regular cast male and female mold halves 10 and 11 are formed with channels $10^a$ and $11^a$ adapted to receive a tread forming ring comprising a plurality of matrix sections 12 and 13. Mating surfaces 14 of the matrix sections and $14^a$ of the mold halves are machined to coincide with arcs of radii swung about edges 15 on the molds and matrices. Thus when the matrix sections are placed in the mold halves the inner edges thereof are brought into contact first with the mold, whereupon the sections are swung up into place using the edges 15 as a pivot. The surfaces $14^a$ of the mold halves and the surfaces 14 of the matrix sections being of the same radius will slide on each other when the sections pivot about the edges 15.

The abutting edges of the matrix sections are cut on radial lines as shown at 16 so that the curvature of the mold together with the abutting sections will hold the various sections in place in the mold much in the manner that stones or the like are held in place in an arch. It will be obvious that the edges of the last or key matrix section and the sections abutting therewith in each mold half must be cut so that the key section can be inserted and removed, thus the edges of the key sections $12^a$ and $13^a$ and the sections abutting therewith are cut as indicated at 17. The angle of the cuts 17 is such that the key sections $12^a$ and $13^a$ can be readily inserted and removed and yet when in place firmly and positively hold the remaining sections in the mold halves. Suitable means such as screws 18 are employed to hold the key sections in place.

If it is found desirable to change the tread design in the mold it is only necessary that the screws 18 be removed, whereupon the matrix sections will readily fall out. Then with the mold halves lying flat new matrix sections having the desired tread formation thereon can be readily placed in the mold halves in abutting relation, the key sections being put in last and held in place by the screws 18. It will thus be seen that a mold need not be discarded when it is desired to change the tread design of the tire formed therein. Molds formerly engraved with a tread design may have the tread formations machined off to receive the removable matrices of the invention.

The matrices may be made cheaply, quickly and accurately by engraving suitable dies and then die casting the matrices therein. The edges of the key sections and the sections abutting therewith can, after die casting, be machined to the desired angle.

Although the invention is particularly applicable to tire molds it will be apparent that wherever circular molds are internally engraved the invention can be employed, accordingly various applications and modifications of the invention can be resorted to without departing from the spirit of the invention or the scope of the appended claims.

What is claimed is:

1. In a circular tire curing mold, male and female halves, a ring of tread forming matrix sections received in channels in each of said mold halves, the abutting edges of the sections in each mold half being cut on radial lines so that the various sections hold each other in place, key matrix sections in each of said matrix rings, the edges of said key sections and the matrix sections abutting therewith being cut at an angle to permit the ready insertion and removal of the key sections in the matrix ring, and means for holding said key sections in said matrix rings, thus holding all the matrix sections in the mold halves.

2. In a circular mold, male and female halves, a ring of matrix sections received in channels in each of said mold halves, the abutting edges of the sections in each mold half being cut on radial lines so that the various sections hold each other in place, key matrix sections in each of said matrix rings, the edges of said key sections and the matrix sections abutting therewith being cut at an angle to permit the ready insertion and removal of the key sections in the matrix ring, and means for holding said key sections in said matrix rings, thus holding all the matrix sections in the mold halves.

3. In a circular mold, split halves, matrix sections received in channels in each of said mold halves, the abutting edges of the sections in each mold half being cut on radial lines so that the various sections hold each other in place, key matrix sections, the edges of said key sections and the matrix sections abutting therewith being cut at an angle to permit the ready insertion and removal of the key sections in the matrix ring, and means for holding said key sections in said matrix rings, thus holding all the matrix sections in the mold halves.

4. In a circular tire curing mold, male and female halves, a ring of tread forming matrix sections received in channels in each of said mold halves, said channels and said matrix sections being formed with certain surfaces having the same curvature so that the matrix sections can be pivoted relative to the mold channels to fall into place therein, said curved surfaces sliding on each other during said pivoting action, the abutting edges of the sections in each mold half being cut on radial lines so that the various sections hold each other in place, key matrix sections in each of said matrix rings, the edges of said key sections and the matrix sections abutting therewith being cut at an angle to permit the ready insertion and removal of the key sections in the matrix ring, and means for holding said key sections in said matrix rings, thus holding all the matrix sections in the mold halves.

5. In a circular mold having a mold cavity, mating halves provided with channels in the mold cavity, matrix sections in said channels, the abutting edges of all of said matrix sections except the key sections being cut on radial lines so the various sections hold each other in place, the edges of said key sections and the sections abutting therewith being cut to permit ready insertion and removal of the key section, and means for locking said key sections in place.

6. In a circular mold having a mold cavity, male and female halves, said halves being formed with circumferential channels in said mold cavity, a plurality of matrix sections adapted to be received in said channels, a key matrix section for retaining the aforesaid matrix sections in place of each of said mold channels, said matrix sections being adapted to be rotated into said channels about one edge after the edge is placed therein, said channels and said matrix sections being formed with surfaces of the same curvature cut on arcs swung about the line of pivot of said matrix sections and said mold channels.

7. In a circular mold having a mold cavity, said mold being formed with a circumferential channel in said mold cavity, a plurality of matrix sections adapted to be received in said channel, a key matrix section for retaining the aforesaid matrix sections in said mold channel, said matrix sections being adapted to be rotated into said channel about one edge after the edge is placed therein, said channel and said matrix sections being formed with surfaces of the same curvature cut on arcs swung about the line of pivot of said matrix sections and said mold channel.

8. In a circular mold having a mold cavity, male and female halves, said halves being formed with circumferential channels in said mold cavity, a plurality of matrix sections adapted to be received in said channels, a key matrix section for retaining the aforesaid matrix sections in place of each of said mold channels, said matrix sections being adapted to be rotated in to said channels about one edge after the edge is placed therein, said channels and said matrix sections being formed with surfaces of the same curvature cut on arcs swung about the line of pivot of said matrix sections and said mold channels, the abutting edges of all of said matrix sections but the key sections being cut on radial lines so the various sections hold each other in place, the edges of said key sections and the sections abutting therewith being cut to permit ready insertion and removal of the key sections, and means for locking said key sections in place.

ALBERT A. BUSH.